United States Patent
Tamm et al.

(10) Patent No.: US 12,304,012 B2
(45) Date of Patent: May 20, 2025

(54) ORBITAL WELDING DEVICE WITH SIMPLER HANDLING OF THE MEASUREMENT OF RESIDUAL OXYGEN

(71) Applicant: ILLINOIS TOOL WORKS INC., Glenview, IL (US)

(72) Inventors: Markus Tamm, Uberlingen (DE); Marcel Foh, Markdorf (DE)

(73) Assignee: Illinois Tool Works Inc., Glenview, IL (US)

( * ) Notice: Subject to any disclaimer, the term of this patent is extended or adjusted under 35 U.S.C. 154(b) by 791 days.

(21) Appl. No.: 17/291,066

(22) PCT Filed: Nov. 1, 2019

(86) PCT No.: PCT/US2019/059297
§ 371 (c)(1),
(2) Date: May 4, 2021

(87) PCT Pub. No.: WO2020/096872
PCT Pub. Date: May 14, 2020

(65) Prior Publication Data
US 2021/0387277 A1    Dec. 16, 2021

(30) Foreign Application Priority Data
Nov. 9, 2018    (EP) .................... 18205527

(51) Int. Cl.
*B23K 9/028* (2006.01)
*B23K 9/095* (2006.01)
(Continued)

(52) U.S. Cl.
CPC .......... *B23K 9/0286* (2013.01); *B23K 9/0956* (2013.01); *B23K 9/16* (2013.01);
(Continued)

(58) Field of Classification Search
CPC ...... B23K 9/0286; B23K 9/0956; B23K 9/16; B23K 9/326; B23K 37/027;
(Continued)

(56) References Cited

U.S. PATENT DOCUMENTS

2012/0140234 A1    6/2012    Masterson
2016/0339534 A1    11/2016    Tamm

FOREIGN PATENT DOCUMENTS

DE    202014100241 U1    2/2014
EP    0024438 A1    3/1981
(Continued)

OTHER PUBLICATIONS

PCT, International Search Report and Written Opinion, International Application No. PCT/US2019/059297; date of mailing Feb. 26, 2020, 26 pages.

*Primary Examiner* — Robert G Bachner
(74) *Attorney, Agent, or Firm* — McAndrews, Held & Malloy, Ltd.

(57) ABSTRACT

An orbital welding device (1) for welding two pieces of pipe, the orbital welding device (1) having a welding current source (10) in a welding current source housing (11) and an orbital welding head (20), which is separate from the welding current source housing (11) and is connected to the welding current source (10) by a cable (2), the orbital welding head (20) having a chamber (50) for the use of shielding gas (50) and/or the orbital welding device (1) having a purging device (90) for the use of shielding gas, preferably back-up shielding gas or purge gas, the orbital welding device (1) having an oxygen sensor (40), wherein the oxygen sensor (40) is arranged in or on the welding current source housing (11).

10 Claims, 4 Drawing Sheets

(51) Int. Cl.
  *B23K 9/16*      (2006.01)
  *B23K 9/32*      (2006.01)
  *B23K 37/02*     (2006.01)
  *B23K 101/06*    (2006.01)

(52) U.S. Cl.
  CPC ............ *B23K 9/326* (2013.01); *B23K 37/027* (2013.01); *B23K 37/0276* (2013.01); *B23K 2101/06* (2018.08)

(58) Field of Classification Search
  CPC ............ B23K 37/0276; B23K 2101/06; B23K 9/1006; B23K 37/0217
  See application file for complete search history.

(56) References Cited

FOREIGN PATENT DOCUMENTS

| | | |
|---|---|---|
| JP | 2000137023 A | 5/2000 |
| WO | WO 9611765 A1 | 4/1996 |
| WO | WO 2014130374 A1 | 8/2014 |
| WO | WO 2015112242 A1 | 7/2015 |

ORBITAL WELDING DEVICE WITH SIMPLER HANDLING OF THE MEASUREMENT OF RESIDUAL OXYGEN

TECHNICAL FIELD

The invention relates in general to orbital welding devices having shielding gas chambers.

BACKGROUND

The prior art WO2014130374A1 and WO2015112242A1 discloses the use of oxygen sensors, in particular optical oxygen sensors, for orbital welding, partly with an oxygen sensor arranged in the shielding gas chamber.

The inventors have found it disadvantageous that the measurement of oxygen is still not flexible enough and/or can be awkward to handle.

SUMMARY

It was the object on which the invention is based to improve the above-mentioned disadvantage. The object is achieved by the invention, in particular as defined in the independent claims.

In particular, this object is achieved by an orbital welding device for welding two pieces of pipe, the orbital welding device having a welding current source in a welding current source housing and an orbital welding head, which is separate from the welding current source housing and is connected to the welding current source by means of a cable, the orbital welding head having a chamber for the use of shielding gas, said chamber preferably being designed to surround and to substantially close off to the outside a welding electrode of the orbital welding head during a welding process, and/or the orbital welding device having a purging device for the use of shielding gas, preferably back-up shielding gas or purge gas, the orbital welding device having an oxygen sensor, preferably for measuring an oxygen concentration in the shielding gas, wherein the oxygen sensor is arranged in or on the welding current source housing.

A welding device is thereby provided in an inventive manner with which it is possible to measure oxygen concentrations at various locations in a simple manner with preferably the same oxygen sensor, in particular also in the shielding gas before it has been introduced into the chamber or the pipe interior to the connecting point of the pieces of pipe, i.e. in the fresh gas, since the oxygen sensor is positioned centrally in or on the welding current source housing and therefore can be used simply for various measurements. The oxygen sensor is preferably designed here to measure an oxygen concentration in the shielding gas before it has been introduced into the chamber or to the connecting point of the pieces of pipe (preferably via the purging device into at least one of the pieces of pipe to be welding). Arranged in or on the welding current source housing preferably means that the oxygen sensor is fastened there and also remains or can remain there for the intended measurements of oxygen. By means of the arrangement in or on the welding current source housing, the handling is also facilitated in comparison to separate manual appliances.

In particular, this object is furthermore achieved by an orbital welding device for welding two pieces of pipe, the orbital welding device having a welding current source in a welding current source housing and an orbital welding head, which is separate from the welding current source housing and is connected to the welding current source by means of a cable, the orbital welding head having a shielding gas chamber which is preferably designed to surround and to substantially close off to the outside a welding electrode of the orbital welding head during a welding process, and/or the orbital welding device having a purging device for use of shielding gas, preferably back-up shielding gas or purging gas, the orbital welding device having an oxygen sensor integrated in a component of the orbital welding device, wherein the oxygen sensor is designed to measure an oxygen concentration in the shielding gas before it has been introduced into the chamber or to the connecting point of the pieces of pipe (preferably via the purging device into at least one of the pieces of pipe to be welded).

The quality of the shielding gas can thereby be determined. If, for example, the shielding gas contains too much oxygen, this error source can be found and a different gas cylinder can be used.

The shielding gas for the purging and the shielding gas for the pipe outer casing, i.e. the chamber, can be different shielding gases, i.e., for example, from different gas cylinders. Alternatively, the shielding gas for the purging is the same as the shielding gas which is also used for the pipe outer casing.

Integrated on another component preferably means that the oxygen sensor is fastened
in or to the welding current source housing
or in or to the orbital welding head
or in or to the purging device,
or in or to a gas line between the orbital welding head or purging device and gas source, or in or to the cable,
and also remains or can remain there for the intended measurements of oxygen.

The cable preferably has a minimum of length of 1 m, preferably 2 m, particularly preferably 5 m. The welding current source is preferably stationary while the orbital welding head is portable manually. A welding current source controller is preferably arranged in or on the welding current source housing. The orbital welding head preferably has a pipe holder and a welding electrode holder, which is mounted rotatably in relation to the pipe holder, for holding the welding electrode. The orbital welding device preferably has a preferably electric motor which is activated preferably by means of a motor controller, particularly preferably by means of the welding current source controller, of the orbital welding device, and is designed to drive the welding electrode holder and thus to rotate the latter in relation to the pipe holder. The pipe holder is preferably a clamping holder in the manner of tongs.

The oxygen sensor is preferably connected via a cable or via a wireless data connection to the welding current source controller for the transmission of the measurement signal or the measurement data.

The chamber is preferably configured in such a manner that the pieces of pipe which are intended to be welded to each other are surrounded by the chamber at the ends to be connected. The chamber preferably has an input, for example with a tube connection, for shielding gas with which the chamber can therefore be filled. The air present previously is then forced here out of the chamber through the previously mentioned small gaps or openings. The chamber can also have a dedicated gas output.

The chamber is preferably configured in such a manner that in the chamber the welding electrode can be rotated around the pieces of pipe to be welded.

The orbital welding head preferably has a housing which is adjacent to the chamber and which forms, for example, a handle for a user or a housing for operating or switching elements and/or the motor.

In or on the welding current source housing, the welding current source housing preferably has a gas line on which the oxygen sensor is arranged in such a manner that an oxygen concentration in the gas line can be measured, wherein the gas line is designed to connect a gas source (for example a gas cylinder) to the chamber or to the purging device, or to be a subsection of said connection. One or more tubes which conduct the shielding gas to the chamber are preferably arranged along the cable.

Alternatively or additionally, in the orbital welding head or between orbital welding head and gas source, for example along the cable, the orbital welding device has a gas line on which the oxygen sensor is arranged in such a manner that an oxygen concentration in the gas line can be measured, wherein the gas line is designed to connect a gas source (for example a gas cylinder) to the chamber, or to be a subsection of said connection.

A further orbital welding device according to the invention makes provision for the orbital welding device to be designed to measure by means of the oxygen sensor an oxygen concentration in the chamber.

The orbital welding device preferably has a suction intake device, by means of which shielding gas can be sucked in from the chamber, so that the oxygen concentration therein can be measured. The suction intake device is preferably arranged in or on the welding current source housing.

The orbital welding device preferably has an optical coupling into the chamber, which optical coupling optically couples an optical oxygen sensor to the interior of the chamber, so that the oxygen concentration in the chamber can be measured.

A further orbital welding device according to the invention makes provision for the orbital welding device to be designed to measure by means of the oxygen sensor an oxygen concentration in the interior of at least one of the pieces of pipe to be welded. The oxygen concentration in the pipe interior space can be measured here directly, but also indirectly, for example indirectly by measuring the oxygen concentration in a gas jet emerging from the pipe (for example conducted through a downstream stopper having an outlet opening)—this applies to any measurement mentioned here of the oxygen concentration in the pipe interior space.

The orbital welding device preferably has a suction intake device, by means of which shielding gas can be sucked in from the interior of the at least one of the pieces of pipe to be welded, so that the oxygen concentration therein can be measured. The suction intake device is preferably arranged in or on the welding current source housing.

The orbital welding device preferably has an optical coupling, which optically couples an oxygen sensor to the interior space of the at least one of the pieces of pipe to be welded, so that the oxygen concentration in the interior of the at least one of the pieces of pipe to be welded can be measured.

A further orbital welding device according to the invention makes provision for the orbital welding device to be designed to measure by means of the oxygen sensor an oxygen concentration at various locations simultaneously, for example at two or more of the following locations in the chamber, preferably at a plurality of locations there,
in the interior of at least one of the pieces of pipe to be welded, preferably at a plurality of locations there,
in the shielding gas before it flows into the chamber or into the interior of one of the pieces of pipe to be welded to the connecting point of the pieces of pipe.

A cost-effective, comprehensive measurement of the oxygen is thereby possible. The orbital welding device preferably has various optical waveguides, one end of which is positioned at the various locations and the other end of which is focused on the sensor of the in this case optical oxygen sensor. Alternatively, the orbital welding device has various suction intake channels or tubes and a suction intake device, by means of which gas samples are sucked in to the sensor from the various locations. The orbital welding device is preferably designed to carry out the simultaneous measurement at various locations with sensitivity set at a higher level than if the measurement is carried out with the sensor at just one location, and therefore the averaging arising by means of measurement at a plurality of locations is correspondingly compensated for. For example, in the event of measurement at two locations, the sensitivity is doubled in comparison to a measurement at just one location.

A further orbital welding device according to the invention makes provision for the orbital welding device to have a switching device, which is designed to switch over between a first state and at least one further state, in the first state the oxygen sensor being designed to measure the oxygen concentration in the shielding gas before it has been introduced into the chamber or at least one of the pieces of pipe to be welded to the connecting point of the pieces of pipe, and in the at least one further state the oxygen sensor being designed to measure the oxygen concentration in the chamber or in the interior of at least one of the pieces of pipe to be welded.

By this means, the oxygen concentration at least two different measurement locations can be determined with just one oxygen sensor.

The switching device preferably has a switching valve.

The switching device particularly preferably has an optical switching device by means of which optical paths can be switched on and separated.

A further orbital welding device according to the invention makes provision for the orbital welding device to be designed to perform the following automatically as part of a welding and measuring program carried out by an electronic computer, preferably by the welding current source controller,
first to switch the switching device into the first state and to measure the oxygen concentration in the shielding gas before it has been introduced into the chamber or at least one of the pieces of pipe to be welded to the connecting point of the pieces of pipe, and after a certain time to switch the switching device into the at least one further state and to measure the oxygen concentration in the chamber or in the interior of at least one of the pieces of pipe to be welded.

The quality of the shielding gas is thereby automatically determined prior to the welding and then the oxygen concentration in the chamber or in the pipe interior space is automatically measured.

A further orbital welding device according to the invention makes provision for the orbital welding device to have a further oxygen sensor, the further oxygen sensor being designed to measure the oxygen concentration in the chamber or in the interior of at least one of the pieces of pipe to be welded.

Measurement at a plurality of locations is thereby made possible in an alternative manner.

The further oxygen sensor is preferably arranged in or on the orbital welding head or in or on the purging device or the gas line leading to the purging device or to the orbital welding head.

A further orbital welding device according to the invention makes provision for the orbital welding device to have a memory device and to be designed to log measured residual oxygen measured values
of the shielding gas before it has been introduced into the chamber or via the purging device into at least one of the pieces of pipe to be welded to the connecting point of the pieces of pipe, and/or
of the shielding gas in the chamber or in the interior of at least one of the pieces of pipe to be welded,
in the memory device.

By this means, the correctness or error susceptibility of welded joints can be checked after using the stored residual oxygen values. In addition, it is thereby possible to allow the residual oxygen values to be stored or displayed conveniently, without manual importing of data from mobile separate residual oxygen measuring appliances, together with the welding process logs. The memory device is preferably arranged in or on the welding current source housing.

The object is furthermore achieved by an orbital welding device for welding two pieces of pipe, the orbital welding device having a welding current source in a welding current source housing and an orbital welding head, which is separate from the welding current source housing and is connected to the welding current source by means of a cable, the orbital welding device having a purging device for the use of shielding gas, preferably back-up shielding gas or purging gas, which purging device is connected to a gas source via a gas line, the orbital welding device having an oxygen sensor, wherein the oxygen sensor is fastened in or to the purging device or the gas line.

The purging device preferably has at least one stopper, wherein the oxygen sensor is fastened to a holding device of the stopper. For example, the stopper has, preferably centrally, a hollow rod with an external thread. The purging gas can flow out of the pipe through the hollow rod into the open air again if the stopper is used downstream. By means of a nut on the external thread, the stopper can be squeezed such that the stopper can be positioned in a sealing manner in the pipe because of the increase in the stopper diameter caused by the squeezing. The oxygen sensor is preferably inserted into the hollow rod and/or fastened thereto, for example by means of an internal thread introduced into the hollow rod.

BRIEF DESCRIPTION OF THE DRAWINGS

Aspects of the invention will now be further illustrated by way of example with reference to drawings, in which.

DETAILED DESCRIPTION

Figure 1:
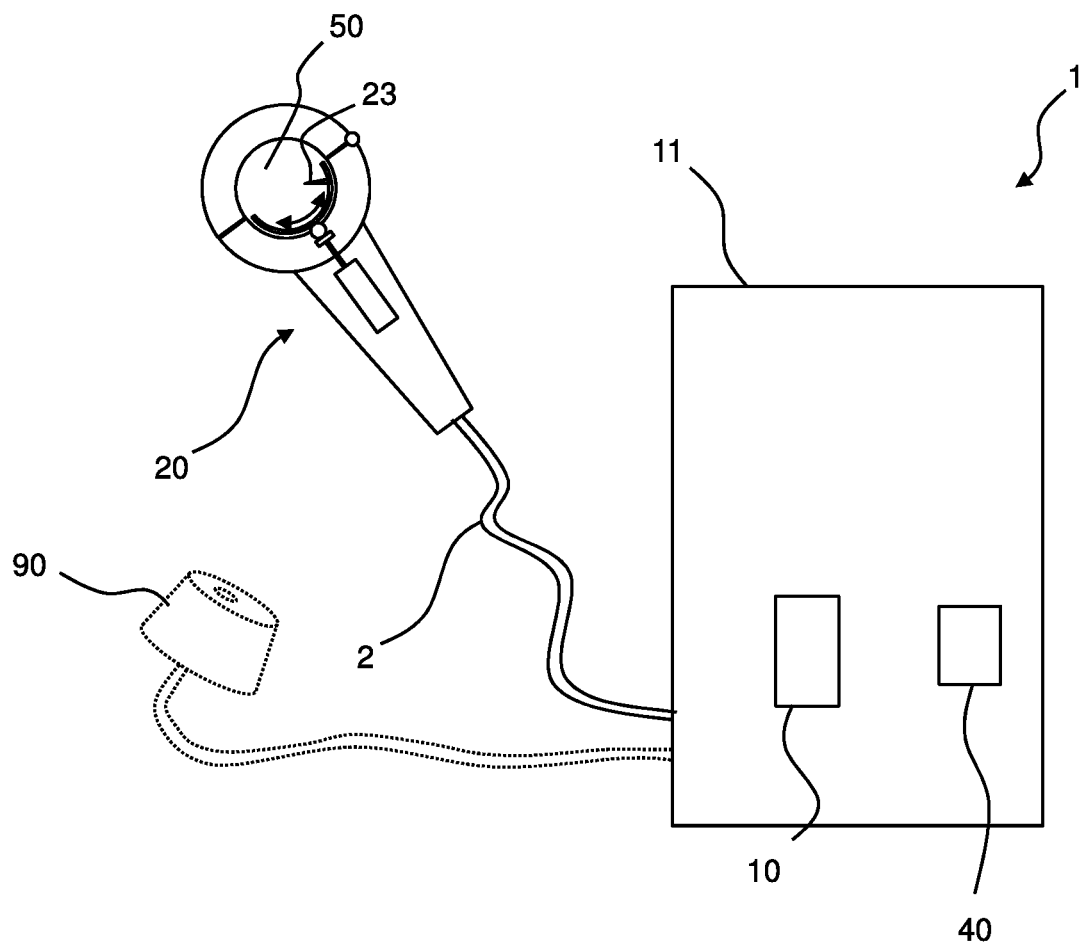
FIG. 1 shows a first embodiment of a device according to the invention.

A more detailed description of FIG. 1 follows. The configuration is such that the orbital welding device 1 has a welding current source 10 in a welding current source housing 11 and an orbital welding head 20, which is separate from the welding current source housing 11 and is connected to the welding current source 10 by means of a cable 2, the orbital welding head 20 having a shielding gas chamber 50 which is designed to surround and to substantially close off to the outside a welding electrode 23 of the orbital welding head 20 during a welding process, the orbital welding device 1 optionally (at points) having a purging device 90 for the use of shielding gas, preferably back-up shielding gas or purge gas, the orbital welding device 1 having an oxygen sensor 40, wherein the oxygen sensor 40 is arranged in or on the welding current source housing 11.

Figure 2:
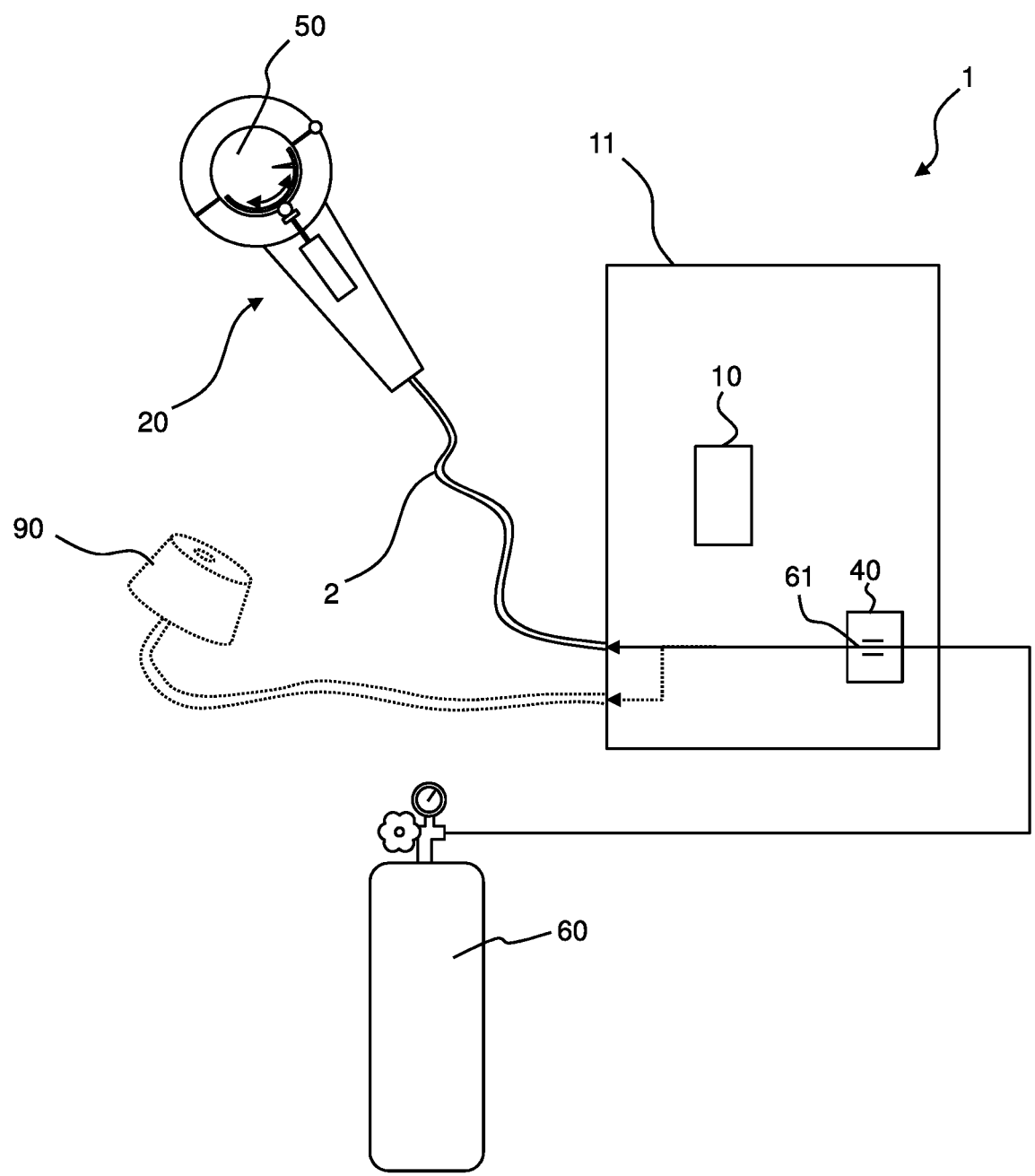
FIG. 2 shows, on the basis of the first embodiment, a second embodiment of a device according to the invention.

A more detailed description of FIG. 2 follows. The configuration is such that the orbital welding device 1 has a welding current source 10 in a welding current source housing 11 and an orbital welding head 20, which is separate from the welding current source housing 11 and is connected to the welding current source 10 by means of a cable 2, the orbital welding head 20 having a shielding gas chamber 50 which is designed to surround and to substantially close off to the outside a welding electrode 23 of the orbital welding head 20 during a welding process, the orbital welding device 1 optionally (at points) having a purging device 90 for the use of shielding gas, preferably back-up shielding gas or purging gas, the orbital welding device 1 having an oxygen sensor 40 integrated in another component of the orbital welding device 1, wherein the oxygen sensor 40 is designed to measure an oxygen concentration in the shielding gas before it is conducted into the chamber 50 (or optionally also or alternatively to the connecting point of the pieces of pipe via the purging device 90). In or on the welding current source housing 11, the welding current source housing 11 here has a gas line 61 on which the oxygen sensor 40 is arranged in such a manner that an oxygen concentration in the gas line 61 can be measured, wherein the gas line 61 is designed to connect a gas source 60 (for example a gas cylinder) to the chamber 50 or optionally also or alternatively to the purging device 90, or to be a subsection of said connection. One or more tubes which conduct the shielding gas to the chamber 50 are arranged here along the cable 2. In this example, the same gas as for the shielding gas in the chamber 50 is used as the purging gas.

Figure 3A:
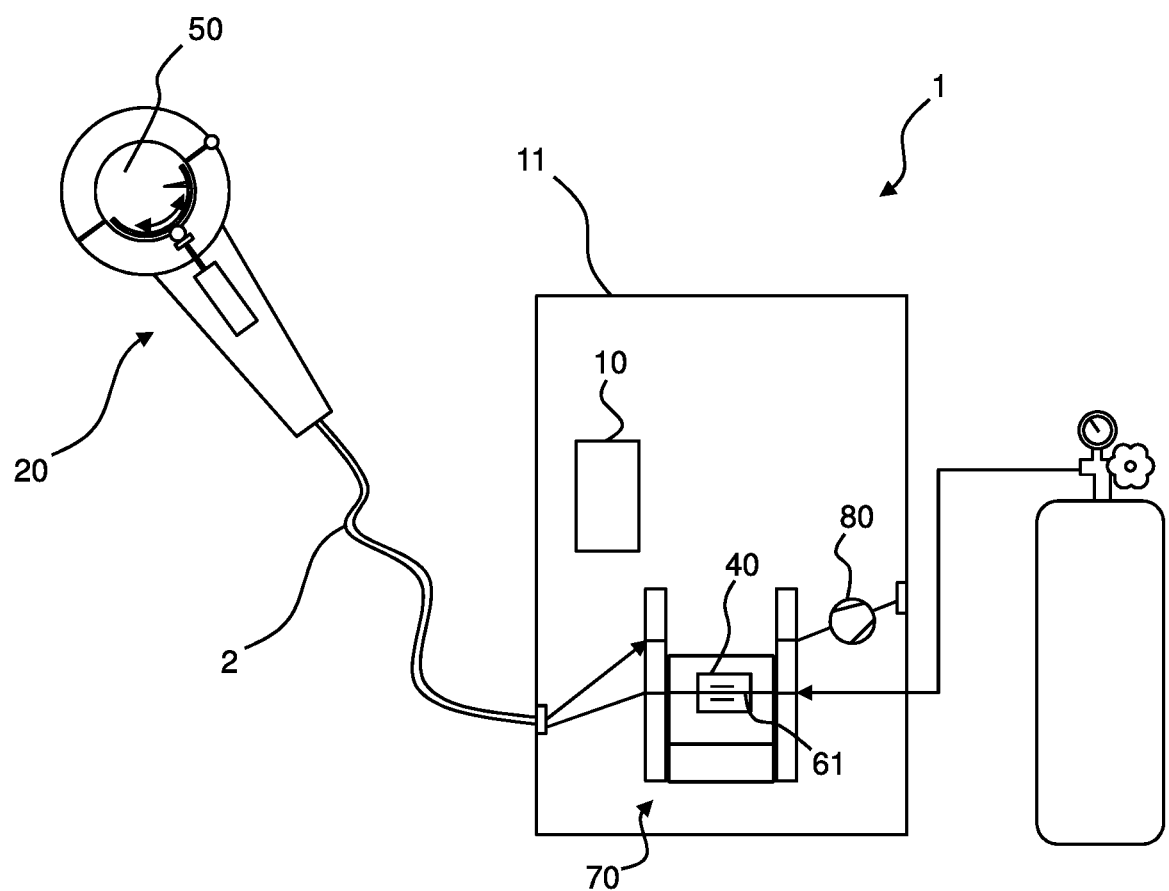
FIGS. 3A and 3B show, on the basis of the first and second embodiment, a third embodiment of a device according to the invention, wherein 3B shows only a cutout of the embodiment shown in FIG. 3A, with the purging device 90 which is optional in the previous figures no longer being present or shown.
Figure 3B:
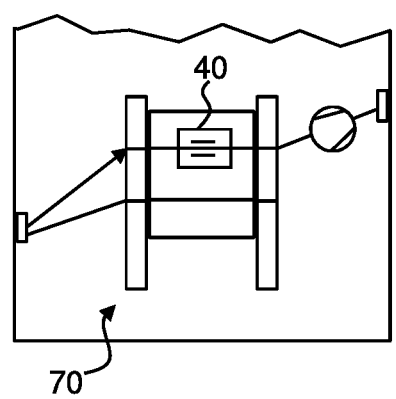

A more detailed description of FIGS. 3A and 3B follows. In FIG. 3A, the switching device 70 is in the first state, and in the second state in FIG. 3B. The configuration is such that the orbital welding device 1 is designed to measure an oxygen concentration in the chamber 50. The orbital welding device 1 here has a suction intake device 80, by means of which shielding gas can be sucked in from the chamber 50, so that the oxygen concentration therein can be measured. The configuration is such that the orbital welding device 1 has a switching device 70, which is designed to switch over between a first state and a second state, in the first state the oxygen sensor 40 being designed to measure the oxygen concentration in the shielding gas before it is conducted into the chamber 50, and in the second state the oxygen sensor 40 being designed to measure the oxygen concentration in the chamber 50. The switching device here has a switching valve. The configuration is such that the orbital welding device 1 is designed to perform the following automatically as part of a welding and measuring program carried out by an electronic computer, here by the welding current source controller—first to switch the switching device 70 into the first state and to measure the oxygen concentration in the shielding gas before it is conducted into the chamber 50, and after a certain time to switch the switching device 70 into the second state and to measure the oxygen concentration in the chamber 50.

Figure 4:
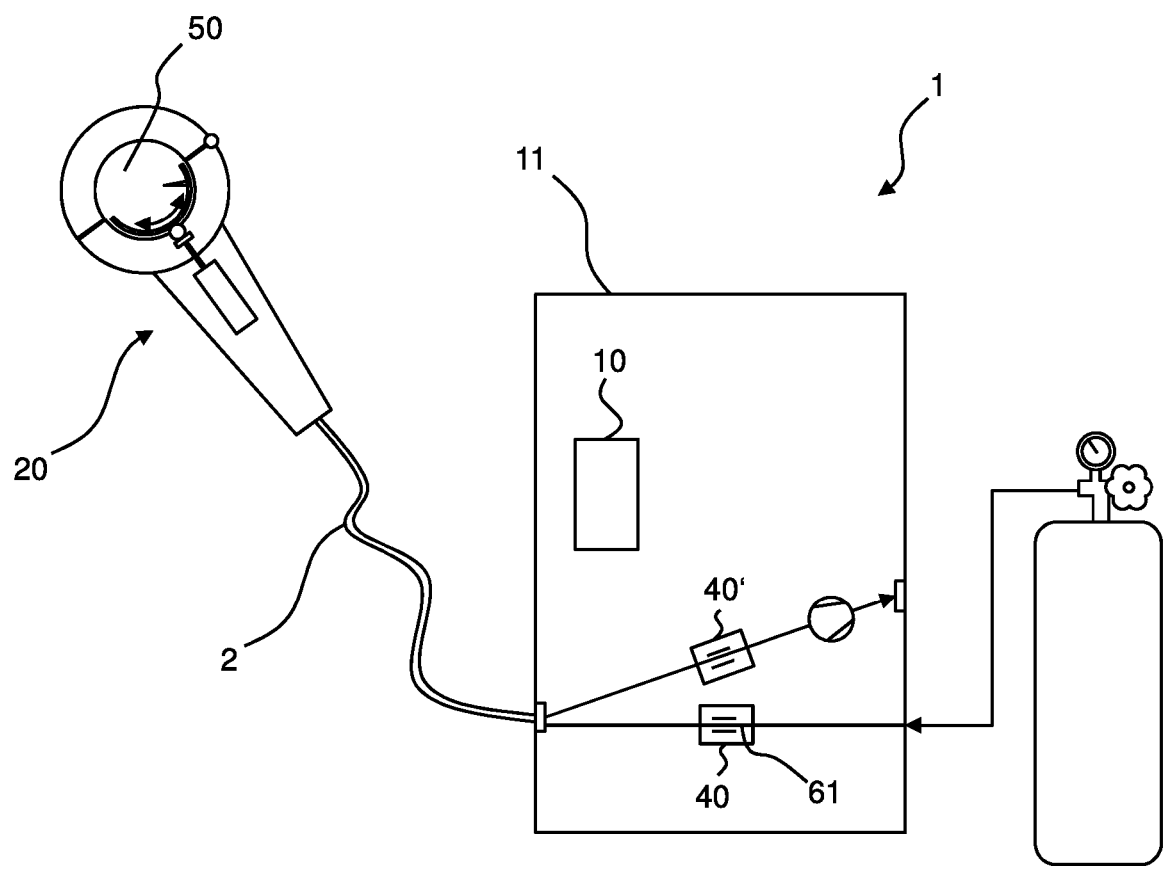
FIG. 4 shows, on the basis of the first and second embodiment, a fourth embodiment of a device according to the invention, with the purging device 90 which is optional in the previous figures no longer being present or shown.

A more detailed description of FIG. 4 follows. The configuration is such that the orbital welding device 1 has a further oxygen sensor 40', the further oxygen sensor 40' being designed to measure the oxygen concentration in the chamber 50, differently than in FIGS. 3A and 3B.

REFERENCE SIGNS

1 Orbital welding device
2 Cable
10 Welding current source
11 Welding current source housing
20 Orbital welding head
23 Welding electrode
40 Oxygen sensor
50 Chamber
60 Gas source
61 Gas line
70 Switching device
80 Suction intake device
90 Purging device
40' Further oxygen sensor

The invention claimed is:

1. An orbital welding device for welding two pieces of pipe, the orbital welding device comprising:
a welding current source in a welding current source housing;
an orbital welding head, which is separate from the welding current source housing and is connected to the welding current source by means of a cable, the orbital welding head having a chamber for the use of shielding gas and/or the orbital welding device having a purging device for the use of shielding gas, preferably back-up shielding gas or purge gas;
an oxygen sensor arranged in or on the welding current source housing; and
a switching device configured to switch over between a first state and at least one further state, wherein in the first state the oxygen sensor is configured to measure the oxygen concentration in the shielding gas before the shielding gas has been introduced into the chamber or at least one of the pieces of pipe to be welded to the connecting point of the pieces of pipe, and in the at least one further state the oxygen sensor is configured to measure the oxygen concentration in the chamber or in the interior of at least one of the pieces of pipe to be welded.

2. The orbital welding device as claimed in claim 1, the orbital welding device being configured to measure, via the oxygen sensor, an oxygen concentration in the chamber.

3. The orbital welding device as claimed in claim 1, the orbital welding device being designed to measure by means of the oxygen sensor an oxygen concentration in the interior of at least one of the pieces of pipe to be welded.

4. The orbital welding device as claimed in claim 3, further comprising a suction intake device configured to intake a sample of the shielding gas from the chamber or from the interior of the at least one of the pieces of pipe to be welded, and conduct the sample to the oxygen sensor, wherein the oxygen sensor is configured to measure the oxygen concentration in the sample.

5. The orbital welding device as claimed in claim 1, the orbital welding device being designed to measure by means of the oxygen sensor an oxygen concentration at various locations simultaneously.

6. The orbital welding device as claimed in claim 1, the orbital welding device being configured to perform the following automatically as part of a welding and measuring program carried out by an electronic computer:
switch the switching device into the first state and to measure the oxygen concentration in the shielding gas before the shielding gas has been introduced into the chamber or into at least one of the pieces of pipe to be welded to the connecting point of the pieces of pipe, and
after a certain time, switch the switching device into the at least one further state and to measure the oxygen concentration in the chamber or in the interior of at least one of the pieces of pipe to be welded.

7. The orbital welding device as claimed in claim 1, wherein:
the orbital welding device comprises a further oxygen sensor configured to measure the oxygen concentration in the chamber or in the interior of at least one of the pieces of pipe to be welded.

8. The orbital welding device as claimed in claim 1, wherein the orbital welding device comprises a memory device and is configured to log, in the memory device, measured residual oxygen measured values of at least one of:
the shielding gas before the shielding gas has been introduced into the chamber (50) or via the purging device (90) into at least one of the pieces of pipe to be welded to the connecting point of the pieces of pipe, and/or
the shielding gas in the chamber or in the interior of at least one of the pieces of pipe to be welded.

9. The orbital welding device as claimed in claim 3, wherein the oxygen sensor is an optical oxygen sensor and the orbital welding device comprises an optical coupling configured to optically couple the oxygen sensor to at least one of an interior space of the chamber or an interior space of the at least one of the pieces of pipe to be welded, so that the oxygen concentration in the corresponding interior space can be measured via the optical coupling.

10. An orbital welding device for welding two pieces of pipe, the orbital welding device comprising:
a welding current source in a welding current source housing;
an orbital welding head, which is separate from the welding current source housing and is connected to the welding current source via a cable, wherein at least one of:
the orbital welding head having a chamber for the use of shielding gas; or
the orbital welding device having a purging device for the use of shielding gas;
an oxygen sensor integrated in a component of the orbital welding device, wherein the oxygen sensor is designed to measure an oxygen concentration in the shielding gas before the shielding gas has been introduced into the chamber or to the connecting point of the pieces of pipe; and
a switching device configured to switch over between a first state and at least one further state, wherein in the first state the oxygen sensor is configured to measure the oxygen concentration in the shielding gas before the shielding gas has been introduced into the chamber or at least one of the pieces of pipe to be welded to the connecting point of the pieces of pipe, and in the at least one further state the oxygen sensor is configured to measure the oxygen concentration in the chamber or in the interior of at least one of the pieces of pipe to be welded.

* * * * *